Patented Aug. 24, 1954

2,687,405

UNITED STATES PATENT OFFICE 2,687,405

ALLYL GLYCIDYL ETHER/ACRYLATE ESTER COPOLYMERS

Henry Shirley Rothrock and William Kenneth Wilkinson, Wilmington, Del., assignors to E. I. du Pont de Nemours & Company, Wilmington, Del., a corporation of Delaware No Drawing. Application February 16, 1950, Serial No. 144,574

6 Claims. (Cl. 260—86.1)

This invention relates to polymeric materials and, more particularly, to new organic copolymers of allyl glycidyl ether.

It is known that ethylenically unsaturated, polymerizable monomers which contain an epoxy group are copolymerizable with other ethylenically unsaturated monomers, particularly those containing halogen substituents, to form copolymers of improved stablity. For instance, British Patent 595,447 discloses that copolymers of improved heat- and light-stability can be prepared from vinyl chloride, or other halogen-containing ethenoid monomers, and compounds containing both a polymerizable, aliphatically unsaturated group and a glycidyl radical. The glycidyl esters of unsaturated acids, such as crotonic, maleic, cinnamic, and the like, are given as illustrations of the latter type monomer. Although these copolymers are more light- and heat-stable than the corresponding homopolymers of the halogen-containing ethenoid monomers, they do not exhibit as good physical properties.

Allyl glycidyl ether, another type of polymerizable, aliphatically unsaturated, epoxy-containing monomer, has recently been synthesized by a new and relatively inexpensive method. Previously, it had been pointed out that allyl glycidyl ether was also capable of copolymerization with halogen-containing aliphatically unsaturated, polymerizable monomers to produce copolymers exhibiting improved light- and heat-stability. However, as is the case with the copolymers described in the above-mentioned British Patent 595,447, these copolymers are not as completely satisfactory in physical properties as are the previously known homopolymers of the halogen-containing ethenoid monomers.

An object of the present invention is to provide new copolymers. A more particular object is to provide new copolymers adapted to be blended with preformed polymers of halogen-containing ethenoid monomers such as polyvinyl chloride, to give compositions of improved heat- and light-stability and favorable physical properties in general. Other objects will be apparent from the description of the invention given hereinafter.

The above objects are accomplished according to the present invention by providing new copolymers of allyl glycidyl ether with hydrocarbon esters of acrylic and alpha-substituted acrylic acids. These new copolymers are readily and easily blendable with other preformed, addition type polymers and copolymers from ethylenically unsaturated monomers to form compositions of improved properties. They are particularly useful in forming blends with the preformed polymers of halogen-containing ethenoid monomers, such as polyvinyl chloride, vinyl chloride/vinyl acetate copolymers, and the like. The blends of the new copolymers of this invention with this latter type of addition polymer are especially outstanding since they exhibit markedly improved heat stability with no apparent decrease in physical properties.

These blends are much superior to the halogen-containing ethenoid polymers themselves since the new copolymers of this invention not only improve the heat stability, but also serve to plasticize the compositions. This latter property is particularly important since in most of the many commercial uses for the halogen-containing ethenoid polymers, plasticization of the polymers has been found to be necessary. In fact, the importance of these halogen-containing ethenoid polymers and their wide current use in the plastics field—coupled with the necessity of plasticizing them for successful and satisfactory useage in these fields—has led to the development of a vast and complicated plasticizer art.

Two of the major problems encountered in this constantly growing plasticizer field for these halogen-containing ethenoid polymers are: (1) the lack of plasticizers which will not exude from the plasticized compositions during use, and (2) the fact that many of the plasticizers contribute appreciably to the already unsatisfactory stability of the halogen-containing ethenoid polymers against heat and light. The copolymers of this invention, serving as they do as both nonexuding, polymeric plasticizers and heat stabilizers for these halogen-containing ethenoid polymers, thus satisfy both of these major needs in one cheap and readily preparable class of materials.

More specifically, the present invention comprises a copolymer of allyl glycidyl ether with a saturated alkyl ester of acrylic or an alpha-substituted acrylic acid, such copolymer containing from 5% to 95%, by weight, of combined allyl glycidyl ether. The term "alkyl ester" as used herein includes cycloalkyl esters. Esters having an alkyl radical containing from 1 to 12 carbon atoms, inclusive, are normally selected and, in most instances, esters having a radical of 2 to 8 carbon atoms, inclusive. The esters having an alkyl radical containing from 2 to 4 carbon atoms, inclusive, are preferred with those having a 4-carbon alkyl radical (n-butyl and isobutyl) the preferred species. Preferably, the copolymer contains from 5% to 50% of combined allyl glycidyl ether as such copolymer has greater plasticizing action together with adequate heat-stabilizing action when blended with a haloethenoid polymer. These copolymers are addition polymers formed in the presence of free radical type addition polymerization initiators, whose polymer chain is solely carbon and wherein the combined allyl glycidyl ether units contain their oxirane ring unchanged.

The following examples in which all parts are given by weight unless otherwise stated, illustrate specific embodiments of the invention.

*Example I*

A glass pressure bottle of internal capacity corresponding to 300 parts of water is charged at 25° C. with 30 parts of allyl glycidyl ether, 20 parts of n-butyl acrylate, 87.9 parts of thiophene-free benzene and 0.5 part of alpha, alpha'-azodiisobutyronitrile. The bottle and its contents are thoroughly flushed with oxygen-free nitrogen and the bottle closed with a spring-cap closure disk lined with a pressed polychloroprene gasket. The pressure bottle is then tumbled end over end in a constant temperature bath at 70° C. for 22 hours. At the end of this time, the bottle is cooled to room temperature, opened, the contents removed, and the solvent and any unreacted monomer removed by distillation at 100° C. under a pressure corresponding to 1 mm. of mercury. There is thus obtained 25.5 parts (51% conversion) of an allyl glycidyl ether/n-butyl acrylate copolymer as a viscous liquid. This copolymer is found by analysis for glycidic oxygen to contain 22% of combined allyl glycidyl ether and to exhibit a molecular weight of 1900 as determined by the ebullioscopic method in benzene.

Other similar polymerizations carried out under identical conditions, varying only in that 20 parts of allyl glycidyl ether to 30 parts of n-butyl acrylate and 10 parts of allyl glycidyl ether to 40 parts of n-butyl acrylate are used, yield, respectively, 41.5 parts (83% conversion) and 40 parts (80% conversion) of allyl glycidyl ether/n-butyl acrylate copolymers as low softening solids. These copolymers are found by analysis for glycidic oxygen to contain 16 and 9%, respectively, of combined allyl glycidyl ether. The latter copolymer exhibits a molecular weight of 2900 as determined by the ebullioscopic method in benzene.

Equal parts of the above-last-described allyl glycidyl ether/n-butyl acrylate copolymer and film-type nitrocellulose of ½ to ¼ second viscosity are mixed in n-butyl acetate to give approximately a 25% solution. This clear, slightly viscous solution is flowed in a thin film onto a glass casting surface and the solvent allowed to evaporate at room temperature. After removal from the casting surface, there is obtained a clear, compatible, flexible, strong, 1-mil film of the copolymer nitrocellulose blend. A control film of nitrocellulose alone cast under identical conditions is no different in appearance. However, the films containing the allyl glycidyl ether/n-butyl acrylate copolymer exhibit better adhesion to the glass casting surface than does the unmodified control film. Furthermore, these modified films exhibited no change in their properties after exposure for approximately 70 hours to ultraviolet light. Similar results were obtained with 1:1 blends of further samples of the above nitrocellulose and the other two allyl glycidyl ether/n-butyl acrylate copolymers described above.

To a 10% solution of high molecular weight polyvinyl chloride in cyclohexanone is added a sufficient quantity of the copolymer obtained as described above from a 10/40 mixture of allyl glycidyl ether/n-butyl acrylate to yield a solution containing polyvinyl chloride and the allyl glycidyl ether/n-butyl acrylate copolymer in a ratio of 2:1. The resulting clear, viscous solution is flowed in a thin film onto a glass plate and the solvent removed by air drying at room temperature. The resulting approximately one mil film of the 2:1 polyvinyl chloride: allyl glycidyl ether/n-butyl acrylate blend is removed from the casting surface and dried at 80° C. Similar films are prepared under identical conditions for comparative purposes with dioctyl phthalate (a commercially used plasticizer) substituted for the allyl glycidyl ether/n-butyl acrylate copolymer. The films of the polyvinyl chloride: allyl glycidyl ether/n-butyl acrylate copolymer blend are clear, flexible and well plasticized. After exposure of all films to ultraviolet light for 274 hours, the control film containing the dioctyl phthalate is soft, weak and somewhat discolored; whereas, the film containing the copolymer of this invention as the plasticizer appears essentially unchanged. Similar results are obtained utilizing the copolymers obtained as described above from the 20/30 and 30/20 allyl glycidyl ether/n-butyl acrylate copolymers.

*Example II*

In a manner similar to that described in the previous example, a mixture of 330 parts of allyl glycidyl ether, 220 parts of isobutyl acrylate, 480 parts of thiophene-free benzene and 5.5 parts of alpha,alpha'-azodiisobutyronitrile are polymerized at 70° C. for 22 hours. The polymer is isolated in the same manner as previously described. There is thus obtained 275 parts (50% conversion) of an allyl glycidyl ether/isobutyl acrylate copolymer.

*Example III*

In a manner similar to that described in Example I, a mixture of 60 parts of allyl glycidyl ether, 40 parts of n-butyl methacrylate, 175 parts of thiophene-free benzene, and 1.0 part of alpha,-alpha'-azodiisobutyronitrile are polymerized at 70° C. for 22 hours. After isolating the polymer in the manner previously described, there is obtained 46 parts (46% conversion) of an allyl glycidyl ether/n-butyl methacrylate copolymer as a viscous liquid. This copolymer, by analysis for glycidic oxygen, is found to contain 9% combined allyl glycidyl ether.

*Example IV*

In a manner similar to that described in Example I, a mixture of 15 parts of allyl glycidyl ether, 10 parts of 2-ethylhexyl acrylate, 44 parts of thiophene-free benzene and 0.25 part of alpha,alpha'-azodiisobutyronitrile are polymerized at 70° for 22 hours. The polymer is isolated as previously described. There is thus obtained 11.7 parts (47% conversion) of allyl glycidyl ether/2-ethylhexyl acrylate copolymer as a colorless, viscous liquid. This copolymer is found by analysis for glycidic oxygen to contain 16 per cent of combined allyl glycidyl ether.

Another similar polymerization varying only in that 5 parts of allyl glycidyl ether and 20 parts of 2-ethylhexyl acrylate are used yields 20.2 parts (81% conversion) of an allyl glycidyl ether/2-ethylhexyl acrylate copolymer which by analysis is found to contain 5.8 per cent combined allyl glycidyl ether.

Example V

A mixture of 30 parts of allyl glycidyl ether, 10 parts of cyclohexyl methacrylate, and 0.4 part of alpha,alpha'-azodiisobutyronitrile is polymerized in a closed glass container under an atmosphere of oxygen-free nitrogen for 16 hours at 60° C. The reactor is opened and the product removed. After heating at 100° C. under a pressure corresponding to 1 mm. of mercury to remove any unpolymerized monomers, there is obtained 14 parts (35% conversion) of an allyl glycidyl ether/cyclohexyl methacrylate copolymer as a colorless viscous liquid, which is found by analysis to contain 43 per cent combined allyl glycidyl ether.

Example VI

A mixture of 30 parts of allyl glycidyl ether, 10 parts of n-octyl methacrylate, and 0.4 part of alpha,alpha'-azodiisobutyronitrile is polymerized in a closed glass container under an atmosphere of oxygen-free nitrogen for 16 hours at 60° C. The reactor is opened and the product removed. After heating at 100° C. under a pressure corresponding to 1 mm. of mercury to remove any unpolymerized monomers, there is obtained 9.5 parts (24% conversion) of an allyl glycidyl ether/n-octyl methacrylate copolymer as a clear, viscous liquid, which is found by analysis to contain 20.6 per cent combined allyl glycidyl ether.

Example VII

A mixture of 30 parts of allyl glycidyl ether, 10 parts of lauryl methacrylate, and 0.4 part of alpha,alpha'-azodiisobutyronitrile is polymerized in a closed glass container under an atmosphere of oxygen-free nitrogen for 16 hours at 60° C. The reactor is opened and the product removed. After heating at 100° C. under a pressure corresponding to 1 mm. of mercury to remove any unpolymerized monomers, there is obtained 9 parts (22% conversion) of an allyl glycidyl ether/lauryl methacrylate copolymer, which is found by analysis to contain 15 per cent combined allyl glycidyl ether.

Example VIII

In a manner similar to that described in Example I a mixture of 15 parts of allyl glycidyl ether, 35 parts of methyl methacrylate, 45 parts of thiophene-free benzene and 0.25 part of alpha,alpha'-azodiisobutyronitrile are polymerized at 65° C. for 16 hours. After isolating the polymer in the manner previously described, there is obtained 37 parts (74% conversion) of an allyl glycidyl ether/methyl methacrylate copolymer as a low-softening, colorless solid. This copolymer by analysis for glycidic oxygen is found to contain 11% combined allyl glycidyl ether.

Example IX

Mixtures containing 75% of a high molecular weight 95/5 vinyl chloride/vinyl acetate copolymer and 25% of the allyl glycidyl ether/n-butyl acrylate copolymers described in Example I are milled at 160° C. for 20 minutes. Similar mixtures, substituting a propylene sebacate polyester (commercially used as a plasticizer for vinyl chloride resins) and strontium octanoate (a commercially used stabilizer for vinyl chloride resins), respectively, for the allyl glycidyl ether/n-butyl acrylate copolymers are milled under identical conditions. The blends containing the allyl glycidyl ether/n-butyl acrylate copolymers of this invention exhibit the best color stability.

Example X

Mixtures containing 75% of a high molecular weight 95/5 vinyl chloride/vinyl acetate copolymer, 21% of a propylene sebacate polyester (commercially used as a plasticizer for vinyl chloride resins) and 4% of the allyl glycidyl ether/n-butyl acrylate copolymers described in Example I are milled for 20 minutes at 160° C. These mixtures exhibit as good or better heat stability than a similar mixture treated under identical conditions which contained strontium octanoate (a commercially used heat stabilizer for vinyl chloride resins) in place of the allyl glycidyl ether/n-butyl acrylate copolymers of this invention.

Approximately 15 mil films of the above-described mixture prepared from the allyl glycidyl ether/n-butyl acrylate copolymer containing 9% combined allyl glycidyl ether were pressed at 160° C. Similar films were pressed under identical conditions from the 75:25 mixture of 95/5 vinyl chloride/vinyl acetate: propylene sebacate polyester mixture discussed in the preceding example. Films of both these compositions were then exposed outdoors. After three weeks, films of the latter composition were black and brittle; whereas, the films containing the allyl glycidyl ether/n-butyl acrylate copolymer of this invention were colorless with many small, brown spots and still flexible. Thus, the allyl glycidyl ether/n-butyl acrylate copolymer clearly serves to stabilize the vinyl chloride resin.

Example XI

Mixtures are prepared containing 75% of a high molecular weight 95/5 vinyl chloride/vinyl acetate copolymer, 21% of a propylene sebacate polyester (commercially used as a plasticizer for vinyl chloride resins) and 4%, respectively, of the allyl glycidyl ether copolymers with n-butyl methacrylate (Example III), 2-ethylhexyl acrylate (the first copolymer in Example IV), n-octyl methacrylate (Example VI), and lauryl methacrylate (Example VII). The mixtures after being milled at 160° C. for 20 minutes are all light yellow in color except the first, which is light brown. In contrast, a mixture containing 75% of the vinyl acetate/vinyl chloride copolymer and 25% of the propylene sebacate polyester, after milling under identical conditions, is black. Thus, the stabilizing action of the allyl glycidyl ether/hydrocarbon acrylate and alpha-substituted acrylate copolymers of this invention for the haloethenoid polymers against degradation by heat is clearly demonstrated.

Example XII

A mixture of 70 parts of rutile titanium dioxide pigment and 100 parts of a relatively low molecular weight finishes grade, 88/12 vinyl chloride/vinyl acetate copolymer is milled on a warm, two-roll rubber mill to a smooth even band with the pigment evenly and thoroughly mixed into the vinyl chloride/vinyl acetate copolymer binder. A solution is prepared by dissolving 23.1 parts of this binder/pigment mixture in 76.9 parts of a 2:1 by weight solvent mixture of cyclohexanone and xylene. A portion of this solution is flowed onto a phosphatized steel panel and the solvent mixture allowed to evaporate at room temperature. The coated steel panel thus obtained is then baked for 30 minutes at 300° F. (approximately 150° C.). The white pigmented coating at the end of this baking cycle is slightly discolored, exhibiting a distinct pinkish tinge, and gives evidence of partial decomposition of the binder.

To another portion of the above-described solution of the pigment and binder is added 3.26 parts (24% calculated on the basis of the vinyl copolymer binder) of the allyl glycidyl ether/n-butyl acrylate copolymer described first in Example I, i. e., containing 22% combined allyl glycidyl ether. The resulting solution is flowed onto a phosphatized steel panel, dried and baked as described previously for the control solution. At the end of the baking cycle, the coated steel panel is clear white with the pigmented coating firmly adhered to the steel and with no traces of decomposition or discoloration. Thus the heat stabilizing action of the allyl glycidyl ether/hydrocarbon acrylate and alpha-substituted acrylate copolymers of this invention for the haloethenoid copolymers is well demonstrated.

It will be understood the above examples are merely illustrative and that the present invention broadly comprises copolymers of allyl glycidyl ether with a hydrocarbon ester of acrylic or an alpha-substituted acrylic acid, more particularly, a saturated alkyl ester of such acid wherein the alkyl radical contains 1 to 12 carbon atoms, inclusive.

The ester to be copolymerized with the allyl glycidyl ether may be an ester of acrylic acid or any alpha-alkyl-substituted acrylic acid such as methacrylic acid, ethacrylic acid, and the like. The hydrocarbon radical of the ester is normally a saturated alkyl (including cycloalkyl) radical as, for example, methyl, n-butyl, isobutyl, 2-ethylhexyl, cyclohexyl, n-octyl, lauryl, and the like. Because of the improved compatability with the haloethenoid polymers, the allyl glycidyl ether copolymers with the lower (preferably, 4 to 8 carbon atoms, inclusive) hydrocarbon acyclic esters of acrylic and the lower alkyl (preferably, 1 to 2 carbon atoms, inclusive) substituted acrylic acids are preferred. The allyl glycidyl ether copolymers with n-butyl and isobutyl acrylates are particularly outstanding.

The copolymers of this invention are prepared by polymerizing together in suitable proportions allyl glycidyl ether and the desired hydrocarbon ester of the acrylic or alpha-substituted acrylic acid. For the best combination of properties those copolymers containing from 5 to 95% combined allyl glycidyl ether and from 95 to 5% combined hydrocarbon ester of an acrylic or alpha-substituted acrylic acid are preferred. Because of their greater plasticizing action and adequate heat stabilizing action coupled with the fact that they do not have an adverse effect on the physical properties of the haloethenoid polymers with which they are blended, those copolymers containing from 5 to 50% combined allyl glycidyl ether and from 95 to 50% combined lower acyclic hydrocarbon ester of acrylic or alpha-lower hydrocarbon substituted acrylic acids are preferred. It should be added that because of the greater plasticizing action conferred upon the haloethenoid polymers those above-last-described copolymers of this invention which are of molecular weight from 500 to 5000, and especially from 1000 to 4000, are particularly preferred.

These copolymers are essentially two component copolymers, i. e., they are essentially composed of the combined allyl glycidyl ether and the combined acrylate or alpha-substituted acrylate ester although the presence of third components in such minor proportions that they do not appreciably affect the properties of the copolymer, come within the scope of the invention. However, it is by no means necessary to use a single ester of the group of acrylic esters herein contemplated as the ester component may comprise two or more of these esters in admixture, the general equivalence of which to a single ester being readily apparent to those skilled in the art.

The copolymers of this invention are prepared by polymerizing in the desired amounts allyl glycidyl ether and the desired acrylate ester in the presence of a polymerization initiator in bulk, suspension, solution or emulsion type systems. Suitable polymerization initiators are well known in the art and comprise hydrogen peroxide, benzoyl peroxide, lauroyl peroxide, potassium persulfate, the azo compounds described in Hunt U. S. Patent 2,471,959, and the like. The azonitrile initiators such as alpha,alpha'-azodiisobutyronitrile, are the preferred ones for the production of these copolymers since they more readily give the desired copolymer in the requisite ranges of molecular weight with relatively easy control. These initiators need be used in only very minor amounts, e. g., between 0.01% and 5.0% and, preferably, from 0.1% to 2.0%, based on the weight of the total polymerizable materials charged.

The polymerization may be carried out under a variety of conditions, for example, the polymerization can be carried out in bulk, solution, or suspension, i. e., emulsion as in aqueous systems, with or without dispersing or emulsifying agents. For the preferred solution polymerization any inert solvent may be used, including those which are also solvents for the copolymer being formed. Examples of suitable solvents include aromatic hydrocarbons such as benzene, toluene, chlorobenzene, the xylenes; aliphatic or cycloaliphatic ketones such as acetone and cyclohexanone; halogenated hydrocarbons such as chloroform and trichloroethane; and aliphatic alcohols such as methanol, ethanol, butanol and isobutanol.

The polymerization temperature is not critical although at low temperatures, e. g., 0 to 10° C., polymerization is rather slow when the usual initiators are employed. It is usually expedient to operate at temperature above 25° C. and preferably between 40 and 100° C. and usually no higher than 150° C. The reaction may be carried out under the autogenous pressure of the reactants at the reaction temperature being used, but, if desired, additional pressure may be applied, e. g., that of an inert gas, such as nitrogen.

The reaction products are obtained as colorless or light-colored polymers ranging from solids to viscous liquids. They are readily soluble in many common solvents, e. g., the aromatic mononuclear hydrocarbons and the aliphatic or acyclic ketones.

The copolymers of this invention are particularly useful for blending with haloethenoid polymers to form compositions of improved flexibility and heat stability for use in the many known and commercially important outlets for these haloethenoid resins. Examples of these outlets are: the coating and impregnating of porous surfaces, such as textiles, e. g., cotton fabrics, or regenerated cellulose fabrics, paper, wood, brick, etc., and in the coating of nonporous surfaces, such as iron, steel, glass and the like. These blends are also useful in such applications as wire-coating and can-coating, and in the preparation of molded and extruded articles, adhesives, unsupported films, fabrics, etc. The copolymers of this invention are also, of course, useable in themselves without necessarily being blended with one of the haloethenoid resins in many of the same applications, such as, in the preparation of adhesives, and the like. These copolymers are also useful as controllable, acid initiated crosslinking or curing agents, which also serve as stabilizers and plasticizers, for such materials as nitrocellulose.

As many apparently widely different embodiments of this invention may be made without departing from the spirit and scope thereof, it is to be understood that the invention is not limited to the specific embodiments thereof except as defined in the appended claims.

The invention claimed is:

1. A copolymer wherein the polymer chain is solely carbon, essentially consisting of 5% to 95% of combined allyl glycidyl ether wherein each ether unit contains its oxirane ring unchanged, and 95% to 5% of a combined ester of an acid from the group consisting of acrylic and the alpha-alkyl-substituted acrylic acids and an alcohol from the group consisting of the monohydric alkanols and cycloalkanols.

2. A copolymer as set forth in claim 1 containing from 5% to 50% combined allyl glycidyl ether.

3. A copolymer wherein the polymer chain is solely carbon, essentially consisting of 5% to 95% of combined allyl glycidyl ether wherein each ether unit contains its oxirane ring unchanged, and 95% to 5% of combined saturated alkyl ester of acrylic acid, the saturated alkyl radical containing from 4 to 8 carbon atoms, inclusive.

4. A copolymer as set forth in claim 3 containing from 5% to 50% combined allyl glycidyl ether.

5. A copolymer wherein the polymer chain is solely carbon, essentially consisting of 5% to 50% of combined allyl glycidyl ether wherein each ether unit contains its oxirane ring unchanged, and 95% to 50% of a combined butyl acrylate, said copolymer having a molecular weight of 1000 to 4000.

6. A copolymer of a monomeric mixture consisting of allyl glycidyl ether and methyl methacrylate, said copolymer containing unmodified epoxy rings and having only carbon in the polymer chain.

References Cited in the file of this patent

UNITED STATES PATENTS

| Number | Name | Date |
|---|---|---|
| 2,160,943 | Britton et al. | June 6, 1939 |
| 2,450,234 | Evans et al. | Sept. 28, 1948 |
| 2,470,324 | Staudinger et al. | May 17, 1949 |
| 2,599,817 | Evans et al. | June 10, 1952 |

FOREIGN PATENTS

| Number | Country | Date |
|---|---|---|
| 595,447 | Great Britain | Dec. 5, 1947 |